July 5, 1966  W. L. HAWKINS ETAL  3,259,603
STABILIZED POLYMERIC COMPOSITIONS
Filed Sept. 20, 1961  2 Sheets-Sheet 1

INVENTORS: W. L. HAWKINS
F. H. WINSLOW
BY
ATTORNEY

July 5, 1966     W. L. HAWKINS ETAL     3,259,603
STABILIZED POLYMERIC COMPOSITIONS
Filed Sept. 20, 1961     2 Sheets-Sheet 2

INVENTORS: W. L. HAWKINS
F. H. WINSLOW
BY
ATTORNEY

United States Patent Office 3,259,603
Patented July 5, 1966

3,259,603
STABILIZED POLYMERIC COMPOSITIONS
Walter L. Hawkins, Montclair, and Field H. Winslow, Springdale, N.J., assignors to Bell Telephone Laboratories, Incorporated, New York, N.Y., a corporation of New York
Filed Sept. 20, 1961, Ser. No. 139,410
5 Claims. (Cl. 260—41)

This invention relates to hydrocarbon polymeric materials stabilized against oxidative degradation. More particularly it concerns polymeric materials containing as an effective stabilizer small amounts of particulate oxides having phenolic groups bonded to their surface. The oxides which when treated in accordance with this invention provide an unexpected degree of stabilization are those of the group IV elements of periods 3, 4, 5 and 6.

The polymers to which this invention is directed are the polymerized alpha-olefins, particularly polyethylene and polypropylene. Examples of other polymeric materials included in the compositions of this invention are: the polymers of butene-1, 3-methyl butene-1, 4-methyl pentene-1, 4,4-dimethyl pentene-1, dodecene-1 and 3-methyl pentene-1; the copolymers of ethylene and various alpha-olefins such as propane and butene-1.

The novel stabilizers of this invention are effective against oxidative degradation known as thermal oxidation. This form of deterioration may occur in the absence of light and is accelerated by increased temperatures. Various stabilizers have been suggested by the prior art to minimize this oxidation mechanism. These stabilizers are usually evaluated by various accelerated test procedures well known to the art which necessarily utilize higher temperatures than those ordinarily encountered in the actual anticipated use of the polymer. These accelerated procedures then require extrapolation of this high temperature data such as by Arhennious plots to the temperature of contemplated use. As a consequence of this method of evaluating and predicting antioxidant behavior of various proposed stabilizers, certain very effective compounds are overlooked. This is due in part to the fact that a material may appear quite unsatisfactory at the elevated temperature and thus be discarded. Some stabilizers, however, show an effectiveness at lower temperatures within the range of ordinary use which is well beyond that which would normally be anticipated from the high temperature data. This behavior is characteristic of the materials of this invention. Long term studies have been made to ascertain their stabilizing capacity at ordinary temperatures. It has been observed that these materials exhibit protection against thermal oxidation at 100° C. for periods in excess of 2000 hours.

The effect of the stabilizers of this invention will perhaps be more fully appreciated from an examination of the drawing in which.

The data represented by these curves was taken from standard accelerated aging tests for polymeric materials. For a complete description of the particular technique see The Journal of Applied Polymer Science, Volume 1, pages 37–49 (1959). The curves represent points from individual runs according to the standard test procedure at various temperatures ranging from 60° C.–140° C. The test procedure is outlined briefly as follows:

The polymer, preferably polyethylene or polypropylene, together with the group IV particles treated as prescribed hereinafter was prepared by mill-massing on a six-inch by twelve-inch two-roll mill having roll speeds of approximately 25 and 35 r.p.m., with the rolls maintained at a suitable temperature. For polyethylene, roll temperatures of 120° C. to 160° C. are acceptable. For polypropylene slightly higher temperatures, e.g. 175° C. are required. In each experiment reported here 3 grams of the complexed group IV oxide were added to 97 grams of the polymer.

Test sheets of the complex-containing polymer were prepared with a thickness of approximately 10 mils. Strips were cut from these sheets each having an approximate weight of 0.1 gram. These test strips were placed in a closed-end Pyrex tube followed by about 2 grams of inde Molecular Sieve, Type 5A or other appropriate absorbent. The tube was connected to an oxygen gas burette and attached to a mercury manometer in a manner such that the manometer read the amount of oxygen absorbed by the polymer sample. The tube was then placed in an air-circulating strip-heater oven maintained at the desired testing temperature to within ±1° C. Readings of oxygen absorbed were made at appropriate time intervals, one such reading being taken every 4 to 12 hours. The effective failure point was considered as the point in time when the sample absorbed 10 cc. oxygen/gram sample. This measure of degradation is an established standard measure of the period at which polyolefins begin to lose effectiveness as insulating sheathing.

Figure 1:
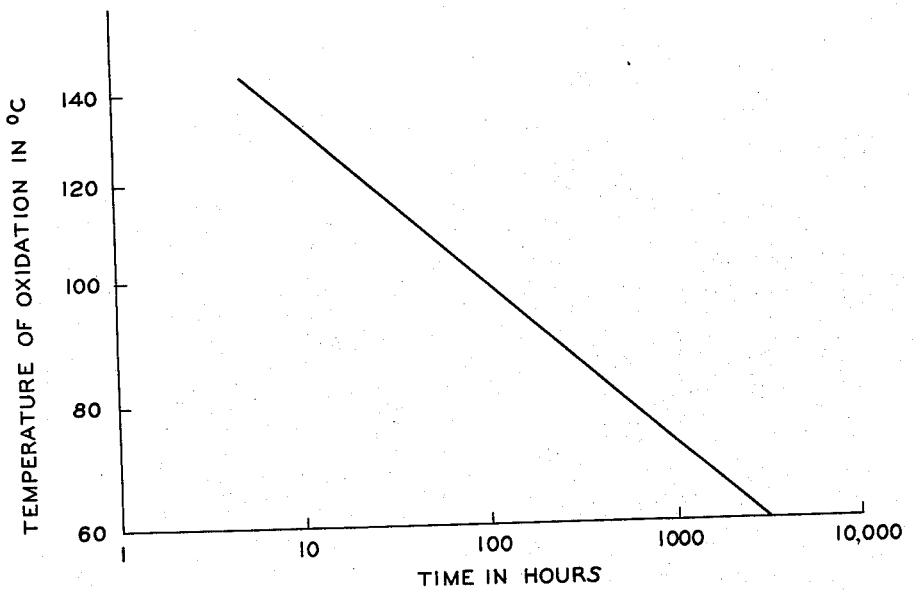
FIG. 1 is a composite plot of several accelerated oxidation tests at various temperatures on pure virgin polyethylene (DYNK) using coordinates of temperature of oxidation test (using pure oxygen) vs. log of time in hours to a standard measure of the effective failure point of the polymer.
Figure 2:
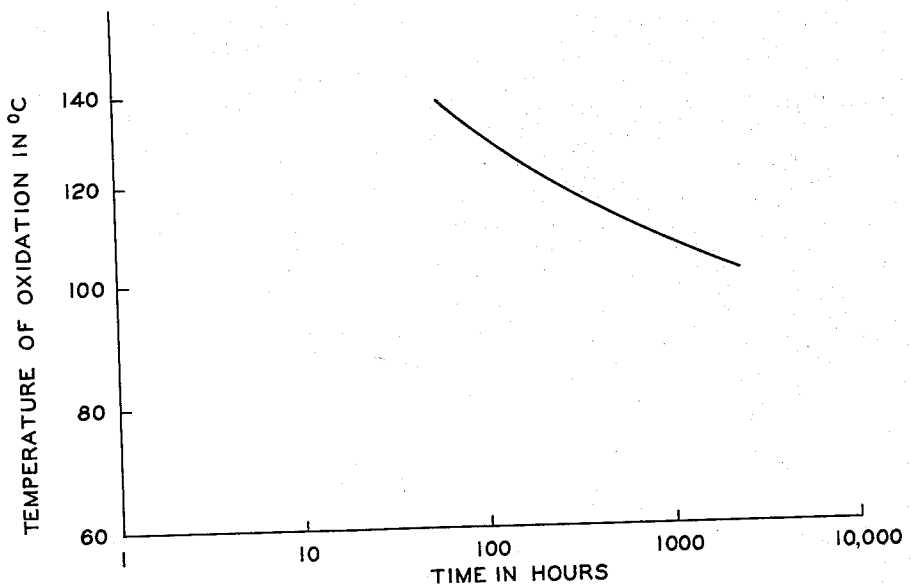
FIG. 2 is a plot on coordinates identical to those of FIG. 1 of accelerated tests of polyethylene containing 3% of $SiO_2$ complexed with pyrogallol.
Figure 3:
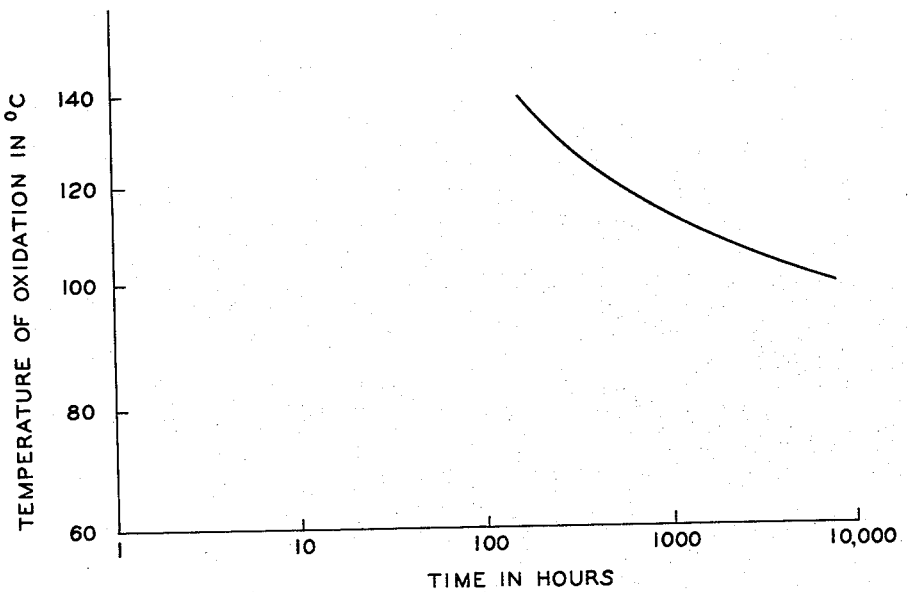
FIG. 3 is a plot on identical coordinates of accelerated oxidation tests of polyethylene containing 3% of $SiO_2$ complexed with catechol.
Figure 4:
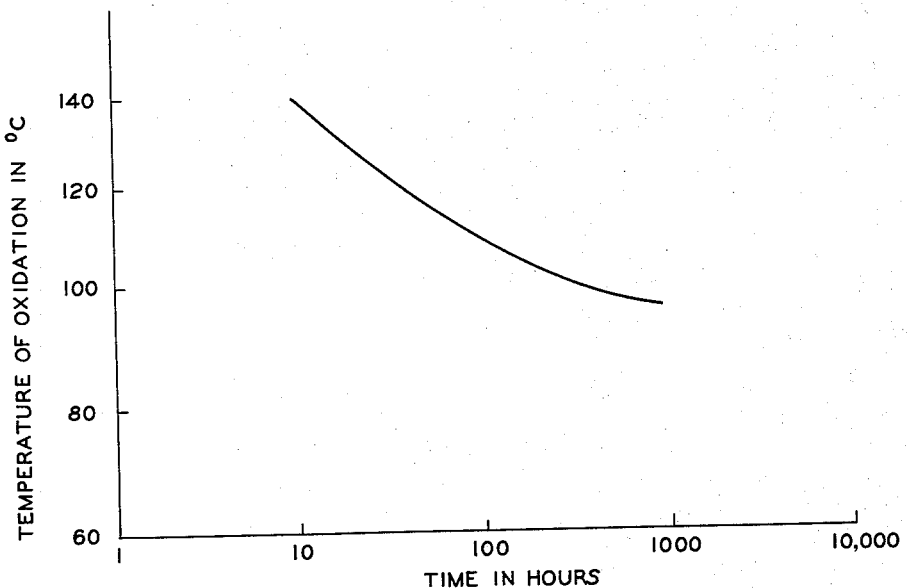
FIG. 4 is a plot on identical coordinates of accelerated oxidation tests of polyethylene containing 3% of $TiO_2$ complexed with catechol.

From these figures it is apparent that these antioxidant materials do not follow the path which would be predicted from the usual high temperature data (failure times obtained at temperatures in the range 120° C.–150° C. Antioxidant data is commonly predicted by a straight line extrapolation through the high temperature points which typically provides a line having a slope similar to that of FIG. 1.) Thus, the antioxidant behavior of polymers stabilized with the materials of this invention uniformly exhibits useful and unexpected effectiveness at tempratures in the range of contemplated use.

The following examples illustrate methods for chemically bonding active phenolic groups to the surface of the group IV oxide particles.

*Example I*

Ten grams of silicon dioxide were reacted in carbon tetrachloride solution (210 cc.) with silicon tetrachloride (10 cc.). After refluxing for two hours, the unreacted halide was distilled off with 10 cc. of solvent. Ten grams of pyrogallol was added to the reaction mixture and the mixture was refluxed for an additional two hours. The reaction solution yielded a pale lavender complex which was separated by filtration, washed twice with benzene and dried in a vacuum desiccator. This complex consisted of silica particles having phenolic groups chemically bonded to their surface.

*Example II*

In this example the same general procedure of Example I was followed except that the intermediate reactant was $BC_3$. The product and yield were essentially identical to that of Example I.

Example III

In this example catechol was used as the polyhydric phenol to provide phenolic groups on the oxide particles. The product obtained was similar to that of Example I except that monohydric groups were bonded to the surfaces of the silica particles.

Example IV

To illustrate the adaptability of this invention to the group IV–A oxides, titanium dioxide particles were used in place of silica particles. The procedure was otherwise identical to that of Example I. The product obtained consisted of titanium dioxide particles with phenolic groups bonded to their surface.

The phenol used as the reactant to bond a phenolic group to the group IV particle must be a polyhydric phenol since one hydroxy group is utilized for the chemical bond. For the purposes of this invention any polyfunctional phenol is appropriate. Of these, the dihydric phenols, catechol, resorcinol and quinol, and the trihydric phenols such as pyrogallol, phloroglucinol and trihydroxybenzene are the simplest and most obvious. However, compounds having additional groups are also effective such as methyl resorcinol. Also, polynuclear phenols such as 1,2-dihydroxynaphthalene are also appropriate. Thus it is essential only that the chemical group bonded to the particle surface contains a phenolic group.

The oxide particles to which the phenolic groups may be bonded are the dioxides of the elements in groups IV–A and IV–B, periods 3, 4, 5 and 6 of the Periodic Table. Specifically these include $SiO_2$, $GeO_2$, $SnO_2$, $PbO_2$, $TiO_2$, $ZrO_2$, $HfO_2$ and mixtures thereof.

The amount of complexed oxide incorporated into the polymer is dependent in part upon the degree of protection desired. For most purposes .2% to 5% of complex oxide by weight of the total composition is preferred.

The mean diameter of the oxide particles should preferably be restricted to the range 100 to 500 Angstroms. Larger particles preclude proper dispersion within the polymer. Smaller particles are impractical to obtain and difficult to handle.

Various other modifications will become apparent to those skilled in the art. All such variations and deviations which basically rely on the teachings through which this invention has advanced the art are properly considered within the scope of this invention.

What is claimed is:

1. A composition comprising polyethylene containing oxide particles of at least one of the group IV elements of periods 3, 4, 5 and 6, in an amount of 0.2 percent to 5 percent by weight of the polymeric composition, said particles having phenolic groups chemically bonded to their surface.

2. The composition of claim 1 wherein the particles have an average mean diameter of 100–500 Angstroms.

3. The composition of claim 1 wherein the polymerized alpha olefin is polyethylene.

4. The composition of claim 1 wherein the oxide particles are silicon dioxide.

5. The composition of claim 1 wherein the oxide particles are titanium dioxide.

References Cited by the Examiner

UNITED STATES PATENTS

| | | | |
|---|---|---|---|
| 2,514,221 | 7/1950 | Albert. | |
| 2,581,931 | 1/1952 | Albert | 260—45.95 |
| 2,857,355 | 10/1958 | Iler | 260—41 |
| 2,876,133 | 3/1959 | Iler et al. | |
| 2,880,191 | 3/1959 | Newton et al. | |
| 2,970,128 | 1/1961 | Csendes | 260—45.95 |

OTHER REFERENCES

Raff et al., "Polyethylene," Interscience Pub., Inc., 1956, New York, page 104.

ALLAN LIEBERMAN, *Acting Primary Examiner.*

WILLIAM H. SHORT, MORRIS LIEBMAN,
*Examiners.*

B. S. LEON, K. B. CLARKE, J. S. WALDRON,
*Assistant Examiners.*